United States Patent [19]
Kerber

[11] Patent Number: 5,960,618
[45] Date of Patent: Oct. 5, 1999

[54] ROW UNIT CROP GUIDE FOR HARVESTING MULTIPLE ROWS

[75] Inventor: Dathan R. Kerber, Geneseo, Ill.

[73] Assignee: Case Corporation, Racine, Wis.

[21] Appl. No.: 08/780,845

[22] Filed: Jan. 9, 1997

[51] Int. Cl.⁶ ................................................. A01D 45/02
[52] U.S. Cl. ........................... 56/119; 56/94; 56/DIG. 24
[58] Field of Search .................................. 56/119, 73, 80, 56/84, 93, 94, 106, 108, 109, 55, 57, 59, 65, 66, 62, DIG. 20, DIG. 24

[56] References Cited

U.S. PATENT DOCUMENTS

| | | |
|---|---|---|
| Re. 31,063 | 10/1982 | Greiner et al. . |
| Re. 31,064 | 10/1982 | Shriver . |
| 1,586,069 | 5/1926 | Clark et al. . |
| 2,379,822 | 7/1945 | Mitchell et al. . |
| 2,491,195 | 12/1949 | Messenger et al. . |
| 2,527,786 | 10/1950 | Barkstrom . |
| 2,826,031 | 3/1958 | Hansen . |
| 2,961,820 | 11/1960 | Hadley . |
| 3,352,093 | 11/1967 | Procter . |
| 3,496,708 | 2/1970 | Bornzin . |
| 3,528,233 | 9/1970 | Martner et al. . |
| 3,528,234 | 9/1970 | Kowalik et al. . |
| 3,670,482 | 6/1972 | Blanshine et al. . |
| 3,759,021 | 9/1973 | Schreiner et al. . |
| 3,808,783 | 5/1974 | Sutherland et al. . |
| 3,818,685 | 6/1974 | Stoessel et al. . |
| 3,854,272 | 12/1974 | Lane, III et al. . |
| 3,894,382 | 7/1975 | Jauss . |
| 3,940,913 | 3/1976 | Wallenfang et al. . |
| 3,982,384 | 9/1976 | Rohweder et al. . |
| 4,009,557 | 3/1977 | Reicks . |
| 4,106,270 | 8/1978 | Weigand et al. . |
| 4,227,368 | 10/1980 | Mossman et al. . |
| 4,266,394 | 5/1981 | VanGinhoven et al. ..................... 56/94 |
| 4,269,017 | 5/1981 | deBuhr et al. . |
| 4,327,542 | 5/1982 | Van Ginhoven . |
| 4,329,832 | 5/1982 | Pietschmann et al. ............... 56/119 X |

(List continued on next page.)

OTHER PUBLICATIONS

*Farm Show* vol. 20, No. 5, 1996—"Build–It–Yourself" Narrow Row Header Kit.
*Farm Industry News,* vol. 29, No. 11, 1996—"Does Narrow Row Corn Add Up?".
Ontario Farmer, vol. 29, No. 40, 1996—"Thinking 15–inch".
1000 Series Corn Head, Operators Manual, 1995 Case Corporation.
1000 Series Corn Head, Parts Catalog, 1993 Case Corporation.
Allis–Chalmers Tractor Division–Milwaukee, U.S.A., "1918–1960, An Informal History", Copyright 1989 by Alan C. King.
Operators Manual, Setting Up Instructions, "McCormick 34HM–21 Corn Snapper (Two Row, Mounted Type)", International Harvester Company. (Date Unknown).
Instruction Manual and Parts List, "Snapping Unit Frame Field Improvement Parts for McCormick–Deering, No. 14P, No. 24, Corn Pickers", International Harvester Company. (Date Unknown).

(List continued on next page.)

*Primary Examiner*—Terry Lee Melius
*Attorney, Agent, or Firm*—Foley & Lardner

[57] ABSTRACT

A row crop header for a harvesting machine includes a frame, a row unit supported by the frame, a first surface supported by the frame forward the row unit on a first side of the row unit, a second surface supported by the frame forward the row unit on a second side of the row unit, a third surface supported by the frame between the first and second surfaces, and a fourth surface supported by the frame between the first and second surfaces. The first and second surfaces face one another and converge toward the row unit. The third surface faces the first surface to cooperate with the first surface so as to support and channel plants toward the row unit. The fourth surface faces the second surface to cooperate with the second surface so as to support and channel plants toward the row unit.

27 Claims, 3 Drawing Sheets

U.S. PATENT DOCUMENTS

| | | |
|---|---|---|
| 4,333,304 | 6/1982 | Greiner et al. . |
| 4,493,181 | 1/1985 | Glendenning et al. . |
| 4,531,351 | 7/1985 | Sousek . |
| 4,598,535 | 7/1986 | Sousek . |
| 4,771,592 | 9/1988 | Krome et al. . |
| 4,805,388 | 2/1989 | Kell . |
| 5,060,464 | 10/1991 | Caron . |
| 5,528,887 | 6/1996 | Nagy et al. . |

OTHER PUBLICATIONS

CP–8 McCormick Parts Catalog, "34HM–20 Corn Picker, 34HM–21 Corn Snapper, 34HM–22 Sweet Corn Picker (Two–Row, Mounted–Type)", International Harvester Company. (Date Unknown).

ROW UNIT CROP GUIDE FOR HARVESTING MULTIPLE ROWS

FIELD OF THE INVENTION

The present invention relates to machines for harvesting crops planted in rows. In particular, the present invention relates to a harvesting machine header for harvesting a plurality of crop rows with a single row unit.

BACKGROUND OF THE INVENTION

A variety of crops, such as corn and cotton, are typically planted in rows. As a result, the harvesting machine is also equipped with a harvesting head or header specifically configured to harvest the row crop. A conventional row crop header includes a plurality of adjacent row units corresponding to the number of crop rows to be harvested by the header during a single pass across the field. To ensure that the row units align with the crop rows as the harvesting machine crosses the field, adjacent row units are spaced apart from one another based upon the spacing of adjacent crop rows.

During the growing season, wind and other elements often cause the row crops to bend sideways or toward the ground. As a result, headers are usually provided with divider shields or other lifting structures adjacent each row unit. The divider shields raise the downed crop off the ground and ensure that the downed crop is properly directed into the row unit.

An example of a crop typically planted in rows is corn. Corn is conventionally planted in rows having a spacing of greater than 20 inches. However, recent research on the spacing of corn rows has indicated special benefits for narrower row spacings that are 12–16 inches apart. In addition to the obvious increase in yield and crop population, these benefits include improved erosion control and better weed control. The narrower rows also require less chemicals and pesticides per unit of yield, thereby benefiting the environment.

Unfortunately, conventional corn harvesting headers are not well-adapted for harvesting corn rows having a spacing of 16 inches or less. Because the row units of conventional corn heads are spaced for corn rows having a spacing of 20 inches or greater, the row units cannot be aligned with the more closely spaced corn rows. Moreover, due to current minimal spacing requirements for each row unit, the row units cannot be positioned closer to one another to accommodate the more closely spaced corn rows. Because of the misalignment between the row units and the corn rows, the divider shields severely bend and deform the misaligned cornstalks of the corn rows as the harvesting machine crosses the field. The severe bending or deformation of the cornstalks often causes the cornstalks to bend or break. More importantly, the severe deformation of the cornstalk often causes the stalks to lose their ears of corn prior to entering the row unit. Consequently, the ears of corn are wasted on the ground, resulting in poor harvesting efficiency.

SUMMARY OF THE INVENTION

The present invention provides a row crop header for a harvesting machine. The row crop header includes a frame, a row unit supported by the frame, a first surface supported by the frame forward the row unit on a first side of the row unit, a second surface supported by the frame forward the row unit on a second side of the row unit, a third surface supported by the frame between the first and second surfaces, and a fourth surface supported by the frame between the first and second surfaces. The first and second surfaces face one another and converge toward the row unit. The third surface faces the first surface to cooperate with the first surface so as to support and channel plants toward the row unit. The fourth surface faces the second surface to cooperate with the second surface so as to support and channel plants toward the row unit.

In a more preferred embodiment of the crop header, the first and third surfaces converge toward the row unit. Alternatively, the third and fourth surfaces converge away from the row unit.

In the more preferred embodiment of the present invention, the row unit includes a plant portion separating mechanism supported by the frame for separating a plant portion from a respective plant stalk. In the more preferred embodiment, the third and fourth surfaces are vertically adjustable with respect to the first and second surfaces. In particular, the third and fourth surfaces are typically supported by the frame relative to the first and second surfaces.

In the most preferred embodiment, the third and fourth surfaces are defined by a crop guide coupled to the frame by a support. The support is pivotally coupled to the frame. The crop header includes a plurality of vertically spaced detents defined by one of the frame and support and a detent engaging member extending from the other of the frame and the support for engaging one of the plurality of detents to secure the support relative to the frame.

BRIEF DESCRIPTION OF THE DRAWINGS

FIG. 4 is an enlarged fragmentary side elevational view of the harvesting header.

FIG. 5 is a cross sectional view of the harvesting header taken along lines 7—7 of FIG. 4.

DETAILED DESCRIPTION OF THE PREFERRED EMBODIMENTS

Figure 1:
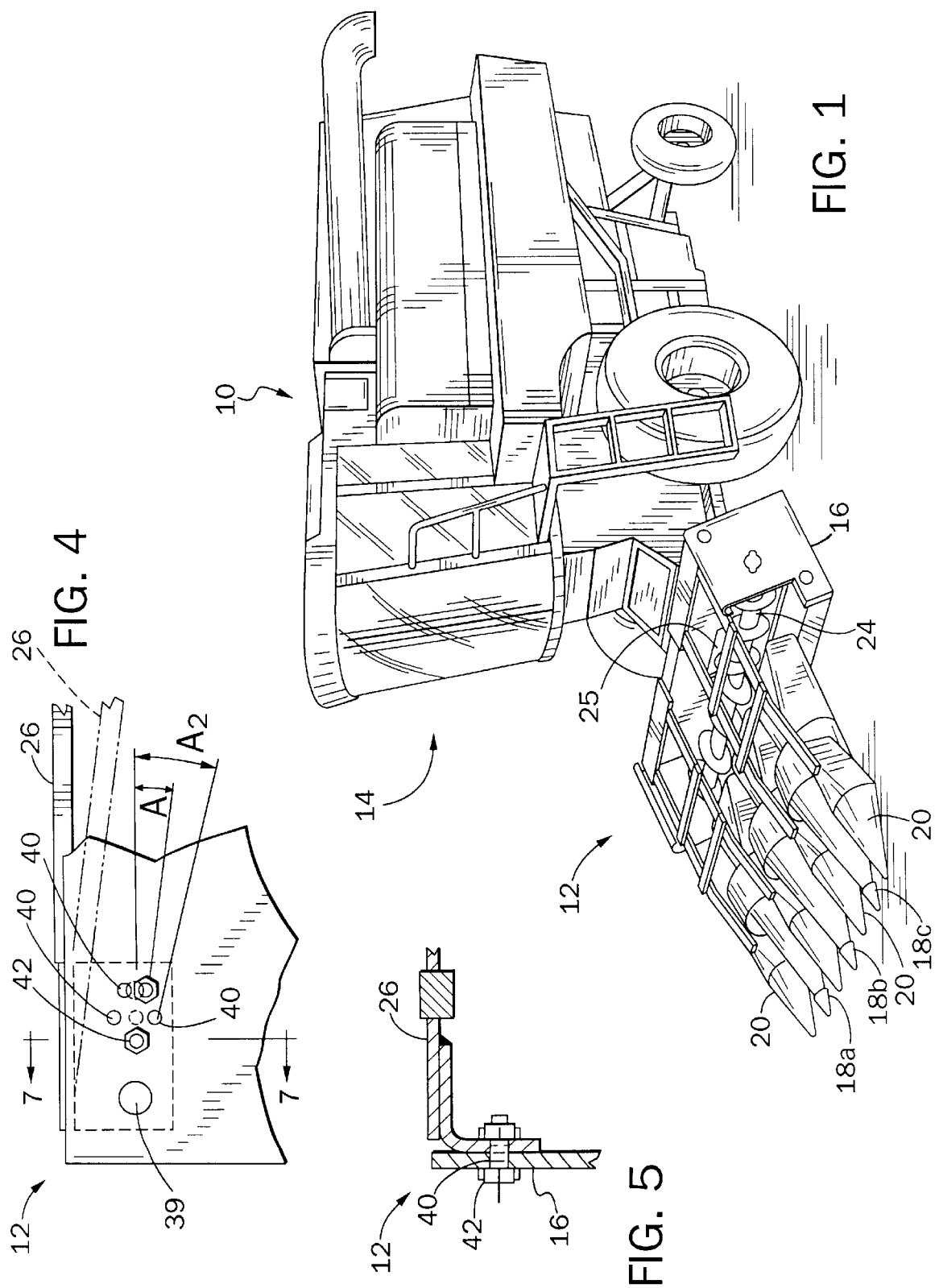
FIG. 1 is a perspective view of a harvesting machine fitted with a harvesting header of the present invention.

FIG. 1 is a perspective view of harvesting machine 10 provided with a head or header 12 for harvesting plants or crops grown in rows. In the exemplary embodiment illustrated, header 12 is specifically designed for harvesting corn. In particular, header 12 is specifically designed for separating ears of corn from the cornstalks and conveying the ears of corn to harvesting machine 10. Harvesting machine 10 includes a threshing mechanism for separating the kernels of corn from the cob and chaff. Harvesting machine 10 collects the kernels of corn in a central bin until the corn is unloaded. Harvesting machine 10 preferably comprises a conventional combine fitted with harvesting header 12.

Harvesting header 12 is mounted at a forward end 14 of harvesting machine 10 and generally includes frame 16, row unit divider shields 18a, 18b, and 18c, row unit crop guides 20, row units 22 (best shown in FIG. 6), and cross conveyor 24. Header 12 additionally includes end divider shields supported by frame 16 on transverse ends of frame 16 adjacent to divider shields 18a and 18c. However, for purposes of illustration, the end divider shields are omitted.

Frame 16 is specifically configured for supporting row unit divider shields 18a–18c, row unit crop guides 20, row units 22 and cross conveyor 24. Frame 16 is preferably removably coupled to front end 14 of harvesting machine 10. Alternatively, frame 16 may be permanently mounted or integrally formed as a part of harvesting machine 10. As can be appreciated, frame 16 may have a variety of different sizes, shapes and configurations depending upon the particular type of crop to be harvested, the particular harvester to which header 12 is fitted and the particular number of row units 22 which are supported by frame 16.

Row unit divider shields 18a–18c are coupled to frame 16 and project forward of frame 16 between adjacent row units 22 and adjacent outer sides of end row units 22. Divider shields 18a–18c preferably project forward of row units 22 to divide and direct the corn rows into adjacent row units 22.

Row unit crop guides 20 are coupled to frame 16 and extend forward of each respective row unit 22 between adjacent row unit divider shields 18a–18c. Crop guides 20 provide surfaces which guide and support rows of crops as the rows of crops are funneled between adjacent divider shields 18 toward intermediate row units 22. Crop guides 20 enable multiple crop rows to be funneled or channeled between adjacent divider shields 18a–18c to a single row unit 22 with increased harvesting efficiency.

Row units 22 (shown in FIGS. 3 and. 6) strip the ear of corn from its respective stalk and convey the ear of corn to cross conveyor 24. Cross conveyor 24 transversely extends adjacent to row units 22 and conveys the ears of corn removed by row units 22 to a central intake 25 where the ears of corn are further conveyed to harvesting machine 10. Although cross conveyor 24 is illustrated as an auger rotatably coupled to frame 16, cross conveyor 24 may alternatively comprise any one of a variety of well-known conveying mechanisms such as driven webs, paddles and other crop moving mechanisms.

Figure 2:
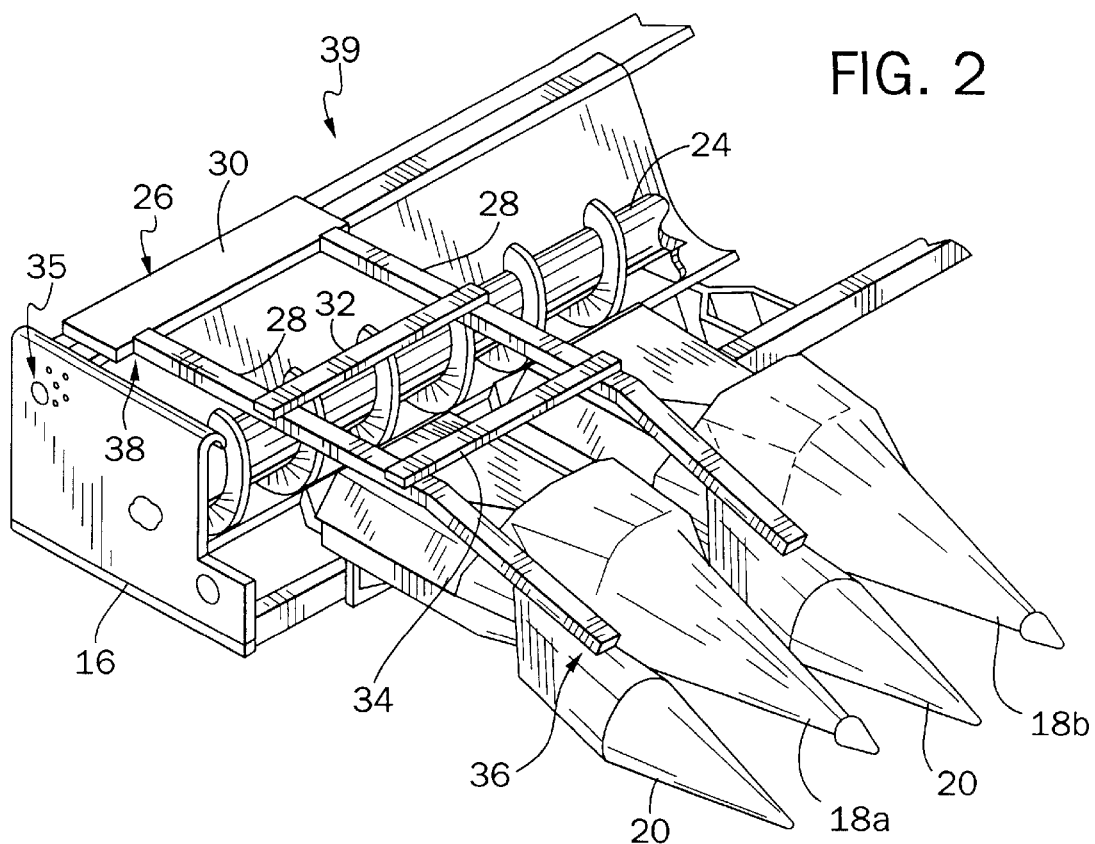
FIG. 2 is a perspective view of the harvesting header.

FIG. 2 is a fragmentary perspective view of harvesting header 12 illustrating row unit crop guides 20 of header 12 in greater detail. As best shown by FIG. 2, row unit crop guides 20 are supported by frame 16 to extend between adjacent divider shields 18. In particular, each crop guide 20 is supported forward a corresponding row unit 22 by support structure 26. Support structure 26 generally includes booms 28, cross braces 30, 32, 34 and height adjuster 35. Booms 28 are generally elongate, rigid bars having a first end 36 coupled to crop guide 20 and a second end 38 coupled to cross brace 30. Each boom 28 extends from cross brace 30 over and above each row unit 22 to support crop guide 20 forward of row unit 22 between adjacent divider shields 18a–18c. Boom 28 is preferably angled for supporting crop guide 20 adjacent to ground in generally the same plane as shields 18a–18c.

Cross braces 30, 32, and 34 are generally elongate, rigid members extending between adjacent booms 28 to rigidify booms 28 so as to maintain a pre-selected spacing between crop guides 20. Cross brace 30 additionally mounts and supports booms 28 and crop guides 20 relative to frame 16. As a result, crop guides 20 may be constructed as a single pre-built assembly that may be simply mounted to frame 16 of an existing header. Alternatively, each crop guide 20 may be supported by an individual support structure.

Figure 3:
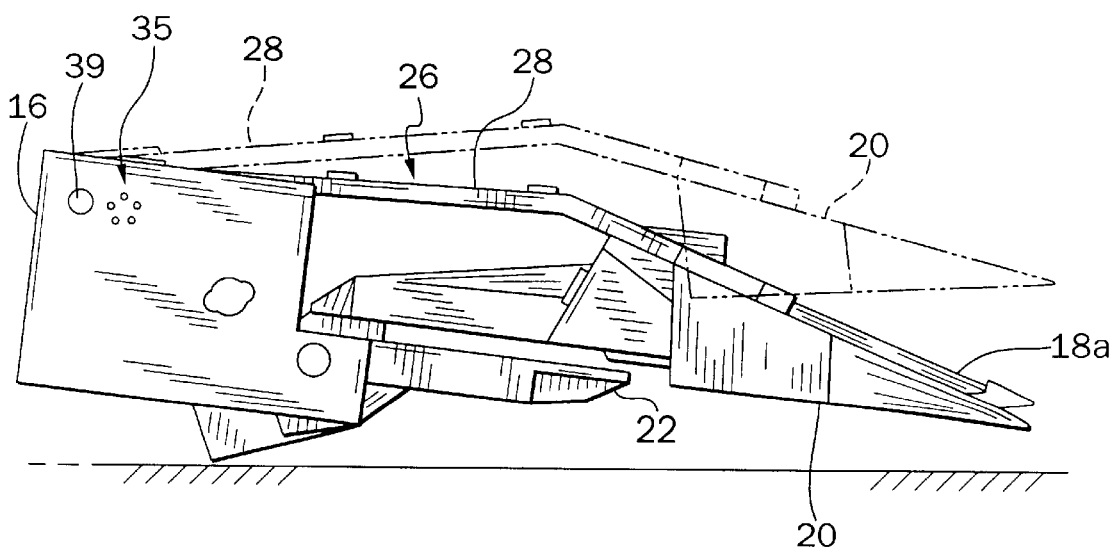
FIG. 3 is a side elevational view of the harvesting header.

FIGS. 3 through 5 illustrate height adjustor 35 of header 12 in greater detail. FIG. 3 is a side elevational view of harvesting header 12 illustrating crop guides 20 supported at various heights relative to divider shields 18. FIG. 4 is an enlarged fragmentary side elevational view of header 12 illustrating height adjuster 35 in greater detail. FIG. 5 is a sectional view of height adjustor 35 taken along lines 7—7 of FIG. 4. As shown by FIG. 3, support structure 26 is preferably pivotally coupled to frame 16 about axis 39 to enable crop guides 20 to pivot between a first lowered position adjacent the ground and a second raised position (shown in phantom) above divider shields 18. In the preferred embodiment illustrated, cross brace 30 is preferably hinged to rear end 39 of frame 16. Because cross brace 30 rigidly interconnects each boom 28 and each crop guide 20, crop guides 20 may be pivoted in unison for quick and easy height adjustment of multiple crop guides 20. Once crop guides 20 are pivoted to a desired height relative to the ground and relative to divider shields 18a–18c, support structure 26 and crop guides 20 are secured in place by height adjuster 35.

As best shown by FIGS. 4 and 5, height adjuster 35 includes a plurality of vertically spaced detents 40 and at least one detent-engaging member 42. Detents 40 preferably extend at least partially through frame 16 and are sized for receiving a detent-engaging member 42. Detent engaging member 42 is preferably a pin or bolt extending from support structure 26 and positioned within one of detents 40. Detents 40 preferably comprise bores extending through a panel of frame 16. To adjust the angle A at which support structure 26 extends from frame 16 and the corresponding height of crop guides 20, detent engaging member 42 is simply repositioned within one of detents 40.

Although height adjuster 35 is illustrated as comprising a plurality of detents 40 defined by frame 16 and a detent engaging member 42 extending from support structure 26, height adjuster 35 may alternatively have a variety of different designs and adjustment mechanisms.

For example, detents 40 may alternatively be defined within a surface of support structure 26 while detent-engaging member 42 extends from frame 16. Other adjustment mechanisms may be used as well. For example, height adjuster 35 may alternatively comprise a chain or cable coupled between support structure 26 and frame 16 or harvesting machine 10 (shown in FIG. 1). In such an arrangement, adjusting the length of the cable or chain would adjust the angle and corresponding height of crop guides 20. In addition, other configurations may also be used for raising and lowering crop guides 20 relative to the ground and divider shields 18. For example, instead of support structure 26 and crop guides 20 pivoting for height adjustment, support structure 26 may alternatively vertically slide or roll along a vertical track. Although it is contemplated that crop guides 20 are manually raised and lowered or pivoted, hydraulic, pneumatic or various mechanical systems may also be provided to pivot crop guides 20 for ease of adjustment.

Figures 6, 7:
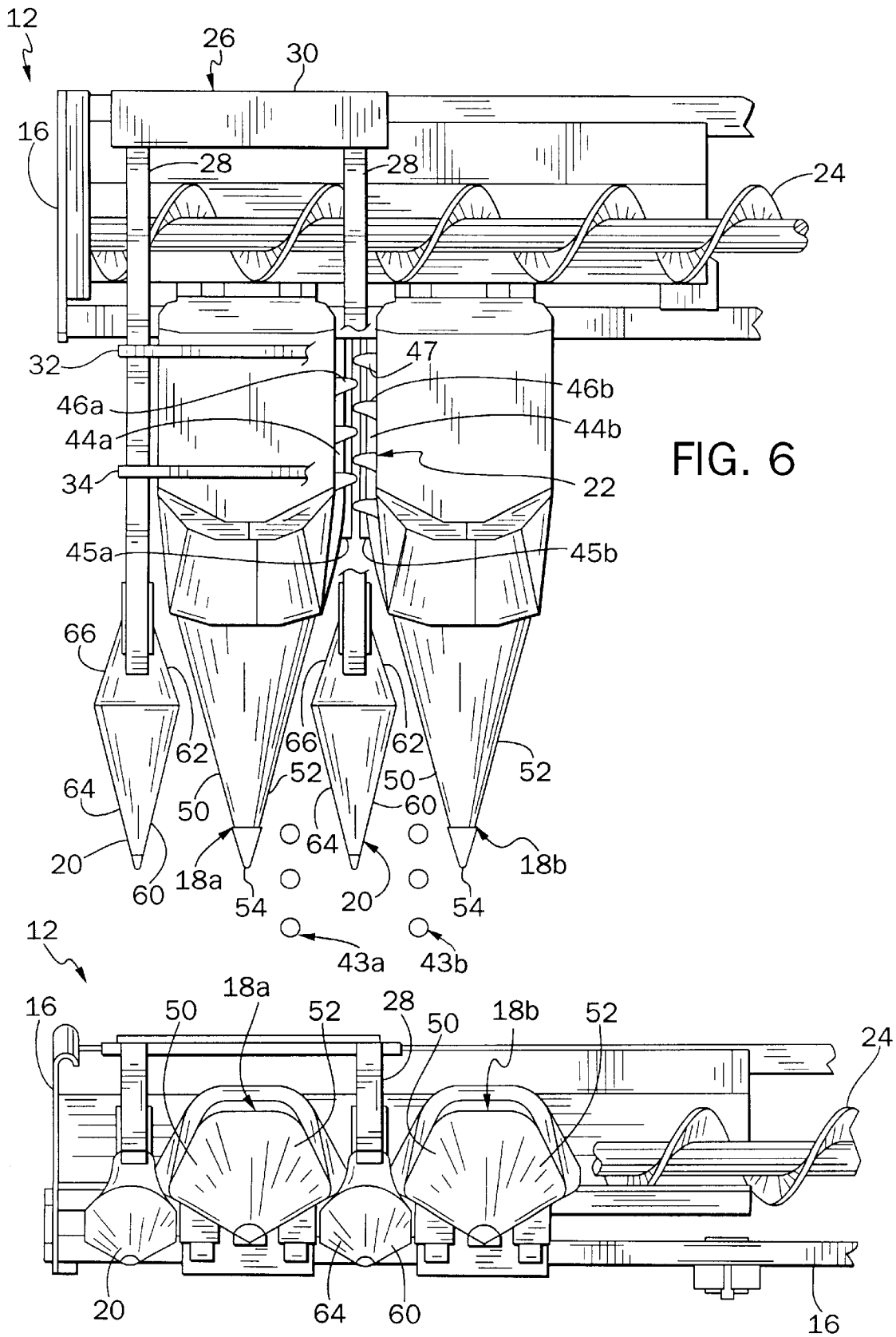
FIG. 6 is a top elevational view of the harvesting header positioned with respect to crop rows.
FIG. 7 is a front elevational view of the harvesting header.

FIGS. 6 and 7 illustrate row units 22 and the relationship between crop guides 20 and divider shields 18 in greater detail. FIG. 6 is a top elevational view of harvesting header 12 confronting crop rows 43a and 43a. FIG. 7 is a front perspective view of header 12. For ease of illustration, only two adjacent and consecutive divider shields 18a and 18b are illustrated. However, the remaining pairs of consecutive and adjacent divider shields are similarly configured and are similarly positioned relative to crop guides 20.

As best shown by FIGS. 6 and 7, row units 22 each preferably include stripper plates 44a, 44b, snapping or stalk rolls 45a, 45b and gatherers 46a, 46b. Stripper plates 44a, 44b are generally elongate flat rigid plates supported by frame 16 along opposite sides of each row unit 22. Stripper plates 44a, 44b of each row unit 22 are preferably sufficiently spaced opposite one another for receiving cornstalks and for allowing cornstalks to pass between stripper plates 44a, 44b. Stalk rolls 45a, 45b are elongate crop engaging members rotatably supported by frame 16 below stripper plates 44a, 44b. As conventionally known, stalk rolls 45a, 45b rotate so as to pull the cornstalks downward through and between stripper plates 44a, 44b to strip ears of corn from the engaged cornstalks. Gatherers 46a, 46b are conventionally known and extend above stripper plates 44a, 44b. Gatherers 46a, 46b include fingers 47 which carry removed ears of corn rearwardly to cross conveyor 24. Alternatively, other conveying mechanisms may be used for conveying the removed ears of corn to cross conveyor 24. Moreover, other plant portion separating mechanisms for separating a plant portion from a respective plant stalk may be used in lieu of stripper plates 44a, 44b and stalk rolls 45a, 45b. For example, co-pending patent application Ser. No. 08/767,818, filed Dec. 16, 1996, attorney docket number 018483/0256, filed on Dec. 17, 1996, entitled.

CORN HEAD SNAPPING AND GATHERING ROW UNIT (herein incorporated by reference), discloses an alternative plant portion separating mechanism. As can be appreciated, row units 22 may include a variety of alternative harvesting mechanisms depending upon the particular crop being harvested by header 12. For example, corn chopper heads used for harvesting corn silage do not separate ears of corn from the stalk. As a result, row units 22 of a header used in a corn chopper would omit stripper plates 44a, 44b and stalk rolls 45a, 45b in lieu of other appropriate harvesting mechanisms.

As further shown by FIG. 6, divider shields 18a and 18b include exterior non-horizontal surfaces 50, 52. Surfaces 50, 52 of consecutive or adjacent divider shields 18a, 18b face one another and converge toward row unit 22 which is aligned between surfaces 50, 52. In particular, surface 52 of divider shield 18a faces surface 50 of divider shield 18b. Surfaces 52 and 50 of divider shields 18a and 18b, converge together toward row unit 22. As a result, surfaces 50, 52 of divider shields 18a and 18b, respectively, form a V-shaped horizontal inlet opening through which crop rows are channeled or funneled to row unit 22. In the preferred embodiment illustrated, surfaces 50, 52 of each individual divider shield 18a, 18b extend forward from row unit 22 and converge at a forward-most point 54. As shown by FIG. 7, surfaces 50, 52 provide divider shields 18a, 18b with a semi-conical shape. Alternatively, surfaces 50, 52 may have a variety of different shapes and configurations so long as surfaces 50, 52 of consecutive or adjacent divider shields 18a, 18b converge together toward an intermediate row unit 22 to funnel the crop rows to the intermediate row unit 22.

Crop guide 20 extends between surfaces 50, 52 of consecutive or adjacent divider shields 18a, 18b and includes surfaces 60, 62, 64, 66. Surfaces 60, 62 of crop guide 22 are generally non-horizontal surfaces which face surface 50 of divider shield 18b. Surfaces 64, 66 of crop guide 20 extend opposite surfaces 60, 62, respectively, and face surface 52 of a consecutive adjacent divider shield 18a. Surfaces 60, 62 cooperate with surface 50 of divider shield 18b to support and channel crop row 43b to row unit 22. Similarly, surfaces 64, 66 cooperate with surface 52 of divider shield 18a to support and channel crop row 43a to row unit 22. Because surfaces 60, 62, 64, 66 intersect the generally horizontal V-shaped opening extending between adjacent divider shields 18a, 18b, surfaces 60, 62, 64, 66 of crop guide 20 provide a reduced width inlet to row unit 22 for each crop row 43a, 43a. Because surfaces 60, 62, 64 and 66 are supported by support structure 26 forward row unit 22 and may be positioned below adjacent divider shields 18a, 18b (as shown by FIG. 7), surfaces 60, 62, 64 and 66 better support crop rows 43a, 43b above row unit 22. As a result, each crop row 43a, 43b is supported on both sides by inwardly facing surfaces of divider shield 18 and crop guide 20 to prevent severe bending or breakage of the cornstalk and to prevent the cornstalk from losing its ear of corn prior to being channeled into row unit 22. Thus, surfaces 60, 62, 64, 66 of crop guide 20 enable each row unit 22 to receive multiple crop rows while maintaining harvesting efficiency.

In the preferred embodiment illustrated, surfaces 60, 64 of each crop guide 20 converge forward or away from row unit 22. Consequently, surfaces 60, 64 cooperate with surfaces 50, 52, respectively, to form a pair of horizontal V-shaped inlet openings forward a single row unit 22. Preferably, surfaces 60, 64 converge to a single point between divider shields 18a, 18b. In the preferred embodiment illustrated, surfaces 62, 66 converge together toward row unit 22. As a result, surfaces 62, 66 cooperate with surfaces 50, 52 of shields 18b, 18c, respectively, to support and channel crop rows 43a, 43b, respectively, toward one another into alignment with row unit 22. Surfaces 60, 64 provide crop guide 20 with a semi-conical nose pointing forward of harvesting header 12. As shown by FIG. 6, surfaces 60, 62 extend opposite surfaces 64, 66 to provide crop guide 20 with a generally diamond shape. Alternatively, crop guide 20 may have a variety of different shapes and configurations so long as surfaces 60, 62, 64 and 66 are non-horizontal and at least indirectly face surfaces 50, 52 of divider shields 18, respectively. For example, in lieu of being diamond-shaped, crop guide 20 may alternatively be oval-shaped, rectangular, triangular, circular and the like.

Although harvesting header 12 is illustrated as including a single crop guide 20 extending between consecutive or adjacent divider shields 18, harvesting 12 may alternatively include two or more individual crop guides 20 supported between consecutive divider shields. In addition, crop guides 20 may be supported between consecutive or adjacent divider shields 18 by a variety of alternative support connections. For example, crop guides 20 may alternatively be supported by support structures extending from adjacent divider shields 18. Crop guides 20 may also be supported by supporting structures extending from harvesting machine 10 (shown in FIG. 1).

Although crop guides 20 are illustrated as being used on a corn head of a combine, crop guides 20 may alternatively be used on a variety of different harvesting equipment for harvesting different row crops. For example, crop guides 20 may also be utilized on other corn harvesting machines such as the heads of corn pickers and choppers. Crop guides 20 may also be used on harvesting heads designed for harvesting other row crops such as cotton. Overall, crop guides 20 enable a single row unit of a harvesting head to harvest multiple crop rows with increased harvesting efficiency.

It will be understood that the foregoing description is of a preferred embodiment of this invention and that the invention is not limited to specific form shown. Other embodiments of the harvesting head will be apparent to those skilled in the art from consideration of the specification disclosed herein. For example, header 12 may have alternative sizes and configurations depending upon the particular harvesting machine 10 to which header 12 is attached, the particular type of row crop being harvested and the number of row units provided by header 12. It is intended that the specification be considered exemplary only, with the true scope and spirit of the invention being indicated by the claims.

What is claimed is:

1. A row crop header for a harvesting machine, the row crop header comprising:
   a frame;
   a row unit supported by the frame, the row unit adapted to receive at least first and second rows of plant stalks;
   a first pair of surfaces supported by the frame forward the row unit on a first side of the row unit to guide the first row of plant stalks into the row unit;
   a second pair of surfaces supported by the frame forward the row unit on a second side of the row unit to guide the second row of plant stalks offset from the first row into the row unit; and
   a guide member supported by the frame above the first and second pairs of surfaces and the row unit to aid in guiding the plant stalks into the row unit.

2. The row crop header of claim 1 wherein the first pair of surfaces includes a first surface supported by the frame forward the row unit on a first side, and a second surface supported by the guide member.

3. The row crop header of claim 1 wherein the second pair of surfaces includes a first surface supported by the frame forward the row unit on a second side, and a second surface supported by the guide member.

4. The row crop header of claim 1 wherein the second surfaces of the first and second pairs of surfaces converge away from the row unit.

5. The row crop header of claim 1 wherein the second surfaces of the first and second pairs of surfaces converge toward the row unit.

6. The row crop header of claim 1 wherein the guide member is vertically adjustable with respect to the first and second pairs of surfaces.

7. The row crop header of claim 6 wherein the guide member is pivotally supported by the frame relative to the first and second pairs of surfaces.

8. The row crop header of claim 7 including means for selectively adjusting a height of the guide member relative to the first and second pairs of surfaces.

9. The row crop header of claim 1 wherein the guide member extends forward a separating mechanism and includes a crop guide secured thereto, the crop guide defining the second surfaces of the first and second pairs of surfaces.

10. The row crop header of claim 9 wherein the guide member is pivotally coupled to the frame.

11. The row crop header of claim 10 including a plurality of vertically spaced detents defined by one of the frame and the guide member and a detent engaging member extending from the other of the frame and the guide member for engaging one of the plurality of detents to secure the guide member relative to the frame.

12. The row crop header of claim 1 wherein the row unit includes:
   a plant portion separating mechanism supported by the frame for separating a plant portion from a respective plant stalk.

13. The row crop header of claim 12 wherein the separating mechanism includes:
   a plurality of stalk rolls; and
   a plurality of stripper plates cooperatively positioned proximate the stalk rolls to separate the plant portion from the respective plant stalk.

14. In a row crop header having first and second spaced apart consecutive plant engaging members for channeling at least two offset rows of plant stalks toward a row unit between the first and second plant engaging members, an improvement comprising:
   a third plant engaging member supported by the header forward and above the row unit between the first and second plant engaging members, the third plant engaging member adapted to aid in guiding the plant stalks into the row unit.

15. The row crop header of claim 14 wherein the first and second plant engaging members include non-horizontal first and second surfaces facing one another on opposite sides of a plant portion separating mechanism, and wherein the third plant engaging member includes a third surface between the first and second surfaces, the third surface facing the first surface, wherein the first and third surfaces cooperate to support and channel a first row of plants toward the separating mechanism.

16. The row crop header of claim 15 wherein the third plant engaging member includes a fourth surface between the first and second surfaces, the fourth surface facing the second surface, wherein the second and fourth surfaces cooperate to support and channel a second row of plants toward the plant separating mechanism.

17. The row crop header of claim 14 wherein the third plant engaging member is diamond-shaped.

18. The row crop header of claim 14 including:
   means for selectively adjusting a height of the third plant engaging member relative to the first and second plant engaging members.

19. The row crop header of claim 18 wherein the row crop header includes a frame supporting the third plant engaging member and wherein the means for selectively adjusting a height includes:
   a plurality of detents defined by one of the frame and the third plant engaging member and a detent engaging member coupled to the other of the frame and the third plant engaging member for engaging one of the plurality of detents to adjustably secure the third plant engaging member relative to the frame.

20. The row crop header of claim 14 wherein the row crop header comprises a corn head for a combine and wherein the row unit includes:
   a plurality of stalk rolls;
   a plurality of stripper plates cooperatively positioned proximate the stalk rolls to separate a corn ear from a respective cornstalk; and
   at least one gatherer proximate the stripper plates for conveying the removed ear of corn.

21. A row unit in a row crop header adapted for harvesting rows of plants, each plant having roots in a growing medium, a stalk extending from the roots and a seed bearing portion extending from the stalk, the row unit comprising:
   a frame;
   a plant portion separating mechanism supported by the frame and configured to separate at least one of the stalk and the seed bearing portion from respective roots;
   a first channel supported by the frame forward the separating mechanism to guide a first row of plants to the separating mechanism;
   a second channel supported by the frame forward the separating mechanism to guide a second row of plants to the separating mechanism; and
   a guide supported by the frame forward the separating mechanism, between the first and second channels, wherein the first and second channels converge into a single third channel at or forward the separating mechanism permitting the separating mechanism to act upon multiple plant rows.

22. The row unit of 21 wherein the guide partially defines the first and second channels.

23. The row unit of claim 21 wherein the guide is pivotably coupled to the frame.

24. The row unit of claim 23 including a plurality of vertically spaced detents defined by one of the frame and the guide and a detent engaging member extending from the other of the frame and the guide for engaging one of the plurality of detents to secure the guide relative to the frame.

25. The row unit of claim 21 wherein the plant separating mechanism is configured to separate the seed bearing portion.

26. The row unit of claim 25 wherein the separating mechanism includes:
    a plurality of stalk rolls; and
    a plurality of stripper plates cooperatively positioned proximate the stalk rolls.

27. The row unit of claim 21 wherein the guide is vertically adjustable.

* * * * *